Figure 1:
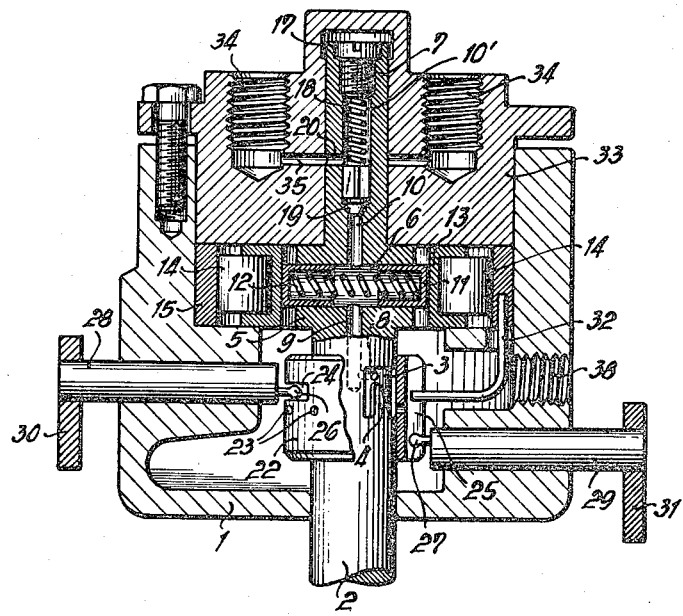

May 3, 1960  U. ALDINGER ET AL  2,935,062
INJECTION PUMPS
Filed Dec. 19, 1957

INVENTORS:
Ulrich Aldinger
Joachim Heiser
by:
Michael S. Striker
Attorney

United States Patent Office 2,935,062
Patented May 3, 1960

2,935,062
INJECTION PUMPS

Ulrich Aldinger, Stuttgart, and Joachim Heiser, Stuttgart-Wangen, Germany, assignors to Robert Bosch G.m.b.H., Stuttgart, Germany Application December 19, 1957, Serial No. 703,880

Claims priority, application Germany December 19, 1956

7 Claims. (Cl. 123—139)

The present invention relates to injection pumps.

It is conventional in injection pumps to provide a rotary piston means acted on during rotation by a camming means which reciprocates the piston means along its suction and pressure strokes during rotation of the piston means. It is also conventional to provide injection pumps with an adjusting structure for adjusting the time when fuel delivery to the several cylinders begins. With certain types of injection pumps, with which the present invention is concerned, the adjustment of the moment of fuel delivery to the several engine cylinders results in driving of the piston means during the pressure strokes thereof by different portions of the camming surface of the cam drive, and as a result the amount of fuel delivered necessarily changes in an undesirable manner.

One of the objects of the present invention is to provide an injection pump in which the piston means will be reciprocated by the same portions of the camming surface of the cam drive irrespective of adjustment of the moment of fuel delivery to the engine cylinders, so that the amount of fuel supplied by the pump to the engine cylinders will not change when the timing is adjusted.

On the other hand, it may be desirable under some conditions to change the amount of fuel supplied to the cylinders in a predetermined, controlled manner when the timing is adjusted. Thus, there is a certain maximum amount of fuel which can be burned in a smoke-free fashion in the engine cylinders, and this maximum amount of fuel depends upon the speed of the engine. Since the timing of the moment of fuel delivery to the engine cylinders will also be regulated as the speed of the engine changes, it may be desirable to regulate in addition the maximum amount of fuel delivered to the engine cylinders so that they never receive more fuel than can be burned in a smoke-free fashion, and it is also an object of the present invention to provide a structure capable of limiting the fuel supplied to the engine cylinders to an amount no greater than that which can be burned in a smoke-free fashion, this regulation of the amount of fuel taking place at the same time as the adjustment of the moment when fuel delivery to the several engine cylinders begins.

A further drawback of conventional injection pumps is that adjustment of the timing may result in a reduction in the cross section of the passages through which fuel flows to the several engine cylinders, and such a constriction in the paths of fuel flow also changes the amount of fuel delivery in an undesirable manner. It is therefore a further object of the present invention to provide an injection pump where the cross section of the fuel passages does not change or is changed in a predetermined, controlled manner when the timing is regulated.

An additional object of the present invention is to provide a structure capable of accomplishing all of the above objects and at the same time composed of simple, ruggedly constructed elements which are reliable in operation.

With the above objects in view, the present invention includes in an injection pump a rotary and reciprocatory piston means and a cam drive means cooperating with the piston means for reciprocating the same during rotation thereof. The cam drive means has a camming portion turnable about the axis of rotation of the piston means for angularly adjusting the camming portion. A feeding and distributor means rotates with the piston means for feeding fuel thereto to be pumped thereby and for distributing the fuel pumped by the piston means, and this feeding and distributor means has a cylindrical control surface portion. A sleeve surrounds and engages this control surface portion and is formed with openings through which fuel moves between the sleeve and the control surface portion, and this sleeve is angularly turnable to different angular positions with respect to the axis thereof to cooperate with the control surface portion for regulating the moment when fuel delivery begins. In accordance with the present invention a means is provided for connecting the camming portion of the cam drive means at least indirectly with the timing sleeve for turning movement about their common axis when the sleeve is turned to change the moment when fuel delivery begins.

Figure 2:
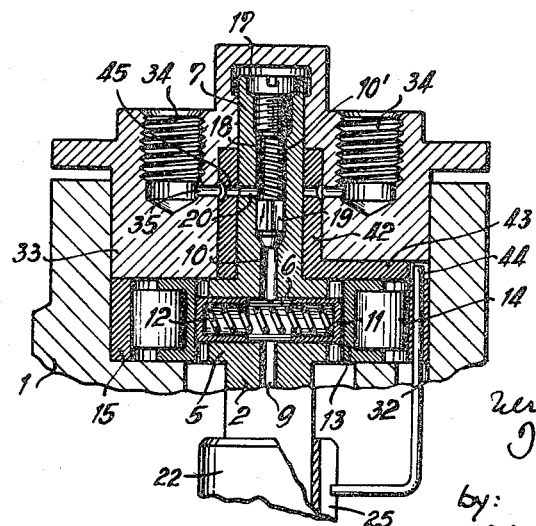

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is an axial sectional elevational view of one possible embodiment of an injection pump according to the present invention; and Fig. 2 is a fragmentary axial sectional elevational view of another embodiment of a structure according to the present invention.

Referring to Fig. 1 the injection pump illustrated therein includes a support means in form of a housing 1 which has located in its interior a means for pumping and distributing fuel to the engine cylinders as well as a means according to the present invention for controlling the moment of fuel delivery while at the same time controlling the amount of fuel delivered. The housing 1 supports a drive shaft 2 for rotation about its axis, and integral with this drive shaft 2 is the pumping and distributing means, as well as the means for feeding the fuel to be pumped to the piston means. The fuel feeding and distributing means includes a control surface portion 4 which defines part of a cut out 3 at the outer surface of the rotary shaft 2 within the housing 1. Above the cut out 3 the shaft 2 has a flange portion 5 formed with the cylindrical bore 6 which is normal to the axis of the shaft 2 and which forms the cylinder and working chamber of the injection pump. Above the flange 5 the shaft 2 is integrally connected with the hollow fuel distributing means 7.

An inlet passage leads from the cut out 3 to the cylinder 6, and this inlet passage takes the form of a radial bore 8 and an axial bore 9 leading from bore 8 to cylinder 6. A fuel discharge passage 10 leads from the cylinder 6 axially along the fuel distributing member 7 to the enlarged hollow interior portion 10′ of member 7, portions 10 and 10′ forming a continuous passage.

The piston means takes the form of a pair of piston members 11 axially slideable in cylinder 6 and urged apart from each other by the spring 12 which extends into and engages the ends of the pistons 11. The spring 12 of the piston means maintains the pistons 11 in engagement with a pair of roller shoes 13, respectively, and a pair of rollers 14 are turnable in the roller shoes, respectively. The roller shoes 13 are radially movable in radial cutouts, respectively, of the flange 5. The rollers and roller shoes form part of a cam drive means which reciprocates the pistons during rotation thereof, and this cam drive means includes the camming ring 15 which has an inner annular camming surface in engagement with the rollers 14 for reciprocating the pistons back and forth a number of times equal to the number of engine cylinders during each rotation of the shaft 2.

The hollow passage portion 10' of distributor 7 is closed by a threaded plug 17 which abuts against one end of a spring 18 the opposite end of which engages and presses against a valve 19 to urge the latter to a closed position against a valve seat formed in the interior of distributor 7 between passage portions 10 and 10'.

The cutout 3 of the shaft 2 and the control surface 4 are covered by a cylindrical control sleeve 22 in which the shaft 2 rotates, and sleeve 22 has an inner cylindrical surface in slidable engagement with the rotating control surface 4. The sleeve 22 is axially and angularly adjustable on the shaft 2 but does not rotate therewith. Sleeve 22 is formed with a number of radial openings 23 corresponding to the number of engine cylinders and distributed about the axis of sleeve 22. This sleeve is formed with a groove 24 perpendicular to its axis and opposite the groove 24 the sleeve 22 is formed with an axial groove 25. A pin 26 eccentrically mounted on one end of shaft 28 is located in groove 24, and a pin 27 eccentrically mounted on one end of shaft 29 is located in groove 25. Shafts 28 and 29 are parallel to each other and are turnably supported by the support means or housing 1, and a pair of levers 30 and 31 are respectively connected with the shafts 28 and 29 for turning the same. Turning of shaft 28 results in axial adjustment of sleeve 22, and turning of shaft 29 results in angular adjustment of sleeve 22. The groove 25 of sleeve 22 receives the free end of a motion transmitting member 32 whose opposite end is fixed with the cam ring 15, as by being pressed into a bore thereof, so that the member 32 serves as a means for connecting cam ring 15 with sleeve 22 for turning movement therewith.

The housing 1 is closed by a cover 33 formed with a plurality of discharge openings 34 equal in number to the number of engine cylinders and communicating therewith through suitable unillustrated conduits. Radial bores 35 formed in member 33 respectively communicate with the openings 34, and distributor 7 is formed with a radial passage 20 forming part of a discharge passage thereof and successively communicating with bores 35 during rotation of distributor 7. The housing 1 is formed with the inlet opening 38 through which fuel flows into the housing 1.

During rotation of the shaft 2 the pistons 11 carry out as many suction and pressure strokes as there are raised camming portions on the cam ring 15. During each suction stroke of the pistons 11 one of the openings 23 of sleeve 22 provides communication between the interior of housing 1 and cutout 3, so that fuel is sucked into cylinder 6. During the next following pressure stroke the previously open passage 23 is closed by the control surface 4. Inasmuch as control surface 4 is narrowest at its top end and becomes progressively wider toward its bottom end, the effective pressure stroke of pistons 11 and thus the amount of fuel delivered is determined by the axial position of sleeve 22, this latter position being controlled by lever 30.

The angular positioning of sleeve 22 by lever 31 determines when the effective pressure strokes begin so the angular positioning of sleeve 22 determines the moment when fuel supply to the several cylinders begins. The transmission member 32 guarantees that the cam ring 15 turns simultaneously with and through the same angle as the sleeve 22. In this way, the portion of the camming surface used for the effective pressure stroke remains the same, and thus with the structure of the invention there will be no change in the amount of fuel delivered when there is a change in timing. The pumped fuel raises valve 19 and flows into passage portion 10' and from the latter through passage portion 20 to one of the discharge openings 34.

The embodiment of the invention which is illustrated in Fig. 2 differs from that of Fig. 1 only in that the distributor member 7 turns in a second sleeve 42 integral with a laterally extending lever arm 43 connected with the cam ring 15. This connection is brought about by extending the transmission member 32 completely through ring 15 and providing it with a free end portion 44 located in a cutout of lever 43. The cover member 33 is provided with a suitable unillustrated cutout in which the arm 43 is free to turn through whatever angle the ring 15 turns through. The sleeve 42 is provided with discharge passages 45 which are in permanent communication with the radial bores 35 of member 33. The outer ends of passages 45 are flared so as to be enlarged, and in this way there is no reduction in the cross section of the paths of fuel flow to the several cylinders resulting from turning of sleeve 42 with respect to cover member 33. As a result of the sleeve 42, even when the discharge passages are of limited volume and when there is relatively large turning of the sleeve 22, there will be no reduction in the cross sectional area of the discharge passages, and thus there will be no throttling of the fuel flow.

It will be understood that each of the elements described above, or two or more together, may also find a useful application in other types of injection pumps differing from the types described above.

While the invention has been illustrated and described as embodied in adjustable injection pumps, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an injection pump, in combination, rotary and reciprocatory piston means for pumping fuel; adjustable cam means cooperating with said piston means for reciprocating the same during rotation thereof, said cam means being turnable at least in part about the axis of rotation of said rotary piston means; and a control sleeve coaxial with said turnable part of said cam means and formed with passages through which fuel flows on its way to the cylinders of an engine supplied by the pump, said sleeve being connected to said turnable part of said cam means for turning movement therewith.

2. In an injection pump, in combination, rotary and reciprocatory piston means; cam drive means cooperating with said piston means for reciprocating the same during rotation thereof, said cam drive means having a camming portion turnable about the axis of rotation of said piston means for angularly adjusting said camming portion; feeding and distributor means rotatable with said piston means for feeding fuel to said piston means to be pumped thereby and for distributing the fuel pumped by said piston means, said feeding and distributor means having a cylindrical control surface portion coaxial with said axis; a sleeve surrounding and engaging said control surface portion and formed with openings through which fuel moves between said sleeve and control surface portion, said sleeve being angularly turnable to different angular positions with respect to said axis for cooperating with said control surface portion to adjust the moment when fuel delivery begins; and means connecting said camming portion to said sleeve for turning movement about said axis when said sleeve is turned about said axis.

3. In an injection pump, in combination, rotary and reciprocatory piston means; cam drive means cooperating with said piston means for reciprocating the same during rotation thereof, said cam drive means having a camming portion turnable about the axis of rotation of said piston means for angularly adjusting said camming portion; feeding and distributor means rotatable with said piston means for feeding fuel to said piston means to be pumped thereby and for distributing the fuel pumped by said piston means, said feeding and distributor means having a cylindrical control surface portion coaxial with said axis; a sleeve surrounding and engaging said control surface portion and formed with openings through which fuel moves between said sleeve and control surface portion, said sleeve being angularly turnable to different angular positions with respect to said axis for cooperating with said control surface portion to adjust the moment when fuel delivery begins; and means connecting said camming portion to said sleeve for turning movement about said axis through substantially the same angle as said sleeve when the latter is turned about said sleeve.

4. In an injection pump, in combination, rotary and reciprocatory piston means; cam drive means cooperating with said piston means for reciprocating the same during rotation thereof, said cam drive means having a camming portion turnable about the axis of rotation of said piston means for angularly adjusting said camming portion; feeding and distributor means rotatable with said piston means for feeding fuel to said piston means to be pumped thereby and for distributing the fuel pumped by said piston means, said feeding and distributor means having a cylindrical control surface portion coaxial with said axis; a sleeve surrounding and engaging said control surface portion and formed with openings through which fuel moves between said sleeve and control surface portion, said sleeve being angularly turnable to different angular positions with respect to said axis for cooperating with said control surface portion to adjust the moment when fuel delivery begins; and transmission means connecting said camming portion to said sleeve for turning movement about said axis through an angle having a predetermined ratio with respect to the angle through which said sleeve is turned about said axis.

5. In an injection pump, in combination, rotary and reciprocatory piston means; cam drive means cooperating with said piston means for reciprocating the same during rotation thereof, said cam drive means having a camming portion turnable about the axis of rotation of said piston means for angularly adjusting said camming portion; feeding and distributor means rotatable with said piston means for feeding fuel to said piston means to be pumped thereby and for distributing the fuel pumped by said piston means, said feeding and distributor means having a cylindrical control surface portion coaxial with said axis; a sleeve surrounding and engaging said control surface portion and formed with openings through which fuel moves between said sleeve and control surface portion, said sleeve being angularly turnable to different angular positions with respect to said axis for cooperating with said control surface portion to adjust the moment when fuel delivery begins, said sleeve being formed in its outer surface with an axial slot; and a motion transmitting member fixed to said camming portion and extending freely into said slot so that turning of said sleeve about said axis is transmitted through said member to said camming portion.

6. In an injection pump, in combination, support means; an elongated pumping and distributing member supported for rotation about its axis by said support means, said member being formed intermediate its ends with a pumping cylinder, being formed ahead of said cylinder with an inlet passage leading to said cylinder, and being formed after said cylinder in the direction of fuel flow with a discharge passage leading from said cylinder, said member having a control surface of predetermined configuration for participating in the control of fuel flow to said inlet passage; piston means rotatable with said member and reciprocable in said cylinder thereof; cam drive means surrounding said member and cooperating with said piston means for reciprocating the same during rotation of said member, said cam drive means including an annular camming ring supported by said support means for adjustable angular turning movement about the axis of said member to adjust the angular position of said ring with respect to said axis; a first sleeve surrounding said control surface and formed with openings through which fuel flows to said inlet passage, said first sleeve being angularly adjustable about said axis for cooperation with said control surface to control the closing of said inlet passage so that during the pressure strokes of said piston means fuel will be pumped thereby to said discharge passage only when said inlet passage in closed; a second sleeve surrounding said member and in which the latter rotates, the said second sleeve being formed with a plurality of openings which respectively form parts of the paths of fuel flow to the several engine cylinders supplied by the pump and said discharge passage successively communicating with said openings of said second sleeve during rotation of said member; and means connecting said second sleeve to said first sleeve for turning movement about said member when said first sleeve turns.

7. In an injection pump as recited in claim 6, said second sleeve also being connected to said camming ring so that the latter and said second sleeve turn when said first sleeve turns.

References Cited in the file of this patent

UNITED STATES PATENTS

| | | |
|---|---|---|
| 2,641,238 | Roosa | June 9, 1953 |
| 2,674,236 | Humber | Apr. 6, 1954 |
| 2,679,804 | Bischoff | June 1, 1954 |
| 2,683,445 | Seaver | July 13, 1954 |
| 2,699,766 | Fodor et al. | Jan. 18, 1955 |
| 2,784,708 | Hill et al. | Mar. 12, 1957 |

FOREIGN PATENTS

| | | |
|---|---|---|
| 723,672 | Great Britain | Feb. 9, 1955 |